(12) United States Patent
Schlicht et al.

(10) Patent No.: US 11,188,428 B2
(45) Date of Patent: Nov. 30, 2021

(54) METHOD, APPARATUS, AND COMPUTER-READABLE STORAGE MEDIUM HAVING INSTRUCTIONS FOR CANCELLING A REDUNDANCY OF TWO OR MORE REDUNDANT MODULES

(71) Applicant: VOLKSWAGEN AKTIENGESELLSCHAFT, Wolfsburg (DE)

(72) Inventors: Peter Schlicht, Wolfsburg (DE); Fabian Hüger, Wolfenbüttel (DE)

(73) Assignee: Volkswagen Aktiengesellschaft

( * ) Notice: Subject to any disclaimer, the term of this patent is extended or adjusted under 35 U.S.C. 154(b) by 5 days.

(21) Appl. No.: 16/626,836

(22) PCT Filed: Apr. 23, 2018

(86) PCT No.: PCT/EP2018/060327
§ 371 (c)(1),
(2) Date: Dec. 26, 2019

(87) PCT Pub. No.: WO2019/001796
PCT Pub. Date: Jan. 3, 2019

(65) Prior Publication Data
US 2020/0117553 A1    Apr. 16, 2020

(30) Foreign Application Priority Data
Jun. 28, 2017 (DE) ............ 10 2017 210 955.6

(51) Int. Cl.
*G06F 11/14* (2006.01)

(52) U.S. Cl.
CPC ...... *G06F 11/1497* (2013.01); *G06F 11/1479* (2013.01)

(58) Field of Classification Search
CPC ............ G06F 11/008; G06F 11/0739; G06F 11/1479; G06F 11/1497
See application file for complete search history.

(56) References Cited

U.S. PATENT DOCUMENTS

| | | | |
|---|---|---|---|
| 7,493,477 B2 * | 2/2009 | Velhal | G06F 11/008 712/220 |
| 7,710,247 B2 | 5/2010 | Sekiguchi | |

(Continued)

FOREIGN PATENT DOCUMENTS

| | | |
|---|---|---|
| DE | 102007023037 A1 | 11/2007 |
| DE | 102008013366 A1 | 9/2009 |

(Continued)

OTHER PUBLICATIONS

Gal et al.; Dropout as a Bayesian Approximation: Representing Model Uncertainty in Deep Learning; Proceedings of the 33rd International Conference on Machine Learning (ICML '16); 2016; vol. 48; pp. 1050-1059.

(Continued)

*Primary Examiner* — Joseph R Kudirka
(74) *Attorney, Agent, or Firm* — Barnes & Thornburg LLP (57) ABSTRACT

A method, an apparatus, and a computer-readable storage medium having instructions for cancelling a redundancy of two or more redundant modules. Results of the two or more redundant modules are received; reliabilities of the results are ascertained; and, based on the ascertained reliabilities, an overall result is determined from the results. The overall result is output for further processing.

19 Claims, 3 Drawing Sheets

(56) References Cited

U.S. PATENT DOCUMENTS 9,384,857 B2 * 7/2016 Wolpert .............. G06F 11/0772
9,566,966 B2    2/2017 Erdem et al.

FOREIGN PATENT DOCUMENTS

EP    0366017 A2    5/1990
WO    0180009 A2    10/2001
WO    2014033172 A1    3/2014

OTHER PUBLICATIONS heatmapping.org; downloaded from http://www.heatmapping.org/; 2015.
Montavon et al.; Explaining nonlinear classification decisions with deep Taylor decomposition; Pattern Recognition; 2017; vol. 65; pp. 211-222.
Ribeiro et al.; "Why Should I Trust You?" Explaining the Predictions of Any Classifier; Proceedings of the 22nd ACM SIGKDD International Conference on Knowledge Discovery and Data Mining (KDD '16); 2016; pp. 1135-1144.
Search Report for International Patent Application No. PCT/EP2018/060327; dated Jul. 11, 2018.

* cited by examiner

METHOD, APPARATUS, AND COMPUTER-READABLE STORAGE MEDIUM HAVING INSTRUCTIONS FOR CANCELLING A REDUNDANCY OF TWO OR MORE REDUNDANT MODULES

PRIORITY CLAIM

This patent application is a U.S. National Phase of International Patent Application No. PCT/EP2018/060327, filed 23 Apr. 2018, which claims priority to German Patent Application No. 10 2017 210 955.6, filed 28 Jun. 2017, the disclosures of which are incorporated herein by reference in their entireties.

SUMMARY

Illustrative embodiments relate to a method, an apparatus, and a computer-readable storage medium having instructions for resolving a redundancy of two or more redundant modules.

BRIEF DESCRIPTION OF THE DRAWINGS

Additional features of the disclosed embodiments will be apparent from the following description and the appended claims, in connection with the figures.

DETAILED DESCRIPTION

Current transportation vehicles frequently have a plurality of assistance systems which assist the driver when driving the transportation vehicle. Semiautonomous or autonomous systems, which enable partially or fully automated driving of the transportation vehicle, are increasingly used.

New generations of assistance systems enable an ever-larger choice of driving maneuvers which can be carried out in an automated manner, as well as increasing complexity of these driving maneuvers. For such functions, data are frequently required which contain the information necessary for carrying out the functions. Such data are typically recorded by transportation vehicle sensors.

In this connection, DE 10 2008 013 366 A1 describes a method for providing information for driver assistance systems. First, measurement data are periodically recorded by environment sensors. Measurement data features are then derived from the current and past values of the measured data. Based on the derived measurement data features, a first association is carried out, in which respectively at least one of several possible measurement data hypotheses is associated with the measurement data of the individual environment sensors. In this case, at least one of the possible measurement data hypotheses relates to the relevance of the measurement data to an object which has already been previously detected in the transportation vehicle environment. Subsequently, a second association is carried out, in which measurement data of at least two environment sensors, which are relevant to a certain object in the transportation vehicle environment according to the first association, are associated with this object. As a function of this second association, an object hypothesis is adjusted which comprises several object characteristics of the object. This object hypothesis can ultimately be provided to the driver assistance system as information.

However, there is often uncertainty as to whether the instantaneously available data are sufficiently safe and reliable, for example, due to sensor defects or shortcomings in the transmission of the data in the communication network of the transportation vehicle.

Against this background, WO 2014/033172 A1 describes a method for carrying out a safety function of a vehicle. By at least one communication system, data which are required for carrying out the safety function are transmitted to a control unit of the vehicle. By the control unit, control signals are generated as a function of the transmitted data and transmitted to a function unit of the vehicle. By the function unit, the safety function is carried out as a function of the control signals. In addition, diagnostic tests are carried out repeatedly at time intervals, wherein via the diagnostic test, it is checked whether a fault exists or an error has occurred in one or in several electrical, electronic, and/or programmable systems used for carrying out this method, which may impair the execution of the safety function or safety-related data. In addition, by the communication system, metadata of the data are transmitted to a control unit, wherein the metadata contain information about at least one of the electrical, electronic, and/or programmable systems used for carrying out the method.

Within the scope of automated driving, the use of redundancy as a safety measure is indispensable. In this case, it must be decided which of the redundantly available modules is activated at run time.

Previously known redundancy systems usually work according to the master-slave principle, in which a main branch assumes the actual function, and a switchover is made to a safe fallback level only in the case of a major safety problem or a component failure.

The classical master-slave redundancy approach is highly suitable for deterministic systems, of which the quality is at a constant level and which are superseded only by a system failure. Under this approach, a static system operates as a primarily executing agent. The fallback level also cooperates the entire time (passively), to be able to intervene correctly in the case of an emergency, but remains otherwise unconsidered.

However, data-driven (intelligent) approaches are more flexible. Situation-specific, locality-specific, or context-specific models are available, and provide learned, optimal behavior in certain situations. However, for such systems, the classical redundancy approach is too inflexible with respect to the fact that the redundant systems predominantly have different outputs. Depending on the situation, in addition, different data-driven approaches result in better results.

Disclosed embodiments demonstrate solutions for resolving a redundancy of decisions of two or more redundant modules, which are suitable for data-driven modules.

This is achieved by a method, a computer-readable storage medium having instructions, and an apparatus.

According to a first disclosed embodiment, a method for resolving a redundancy of two or more redundant modules comprises:

receiving results of the two or more redundant modules;
ascertaining reliabilities of the results;
determining an overall result from the results, based on the ascertained reliabilities; and
outputting the overall result for further processing.

According to a further disclosed embodiment, a computer-readable storage medium contains instructions which, in the case of execution by a computer, trigger the computer for executing the following operations for resolving a redundancy of two or more redundant modules:
receiving results of the two or more redundant modules;
ascertaining reliabilities of the results;
determining an overall result from the results, based on the ascertained reliabilities; and
outputting the overall result for further processing.

In this case, the term "computer" is to be understood broadly. The term also comprises control units and other processor-based data processing apparatuses.

According to another disclosed embodiment, an apparatus for resolving a redundancy of two or more redundant modules comprises:
a reception unit for receiving results of two or more redundant modules;
a processor unit for determining an overall result from the results, taking into consideration reliabilities which are ascertained for the results; and
an output unit for outputting the overall result for further processing.

As soon as redundancy is introduced into the various processing operations between perception and driving maneuver, it is suitable to decide, frequently and at the module level, which of the redundantly available modules are activated. According to the disclosed embodiments, in the case of redundantly available modules, at run time, the more plausible redundantly available information is trusted. The fallback level thus cooperates not only passively, but can also be activated at any time and become the basis of the current decisions. For each data-based module, for example, an artificial neuronal network or other trained models, a reliability of the currently output information is determined for this purpose at run time. Redundantly occurring modules which fulfill the same function are then evaluated on the basis of their results and the ascertained reliability. Instead of the term "reliability," the term "uncertainty values" is often used in the literature. These terms are equivalent; the following holds true: reliability=1−uncertainty value. Previous attempts to compare different data-driven approaches are based on model-intrinsic confidences. However, there are impressive examples of systems which output false results with a high confidence. The confidence alone may therefore be a poor indicator of the resolution of redundancy. Allowance is made for this circumstance by determining the reliability.

Handling contradictory information and resolving redundancy in complex systems is of key importance. The described solution provides a generic possibility to pursue such a redundancy resolution even for modular, data-driven approaches for automated driving. Thus, strengths of individual modules may be played off against one another; this cannot be shown nearly as well in a classical master-slave approach. In addition, the external evaluation of the uncertainty of a module decision is flexible. As a result, it is easier to show an optimization of the driving behavior of automated transportation vehicles than with rigid approaches.

According to at least one disclosed embodiment, the result having the highest reliability is output as the overall result. This approach constitutes the simplest option for determining an overall result. The required computation effort for determining the overall result is thus kept to a minimum.

According to at least one disclosed embodiment, the reliability of the result of a module is ascertained based on at least one of the following indicators: a robustness of the module with respect to changes to the input values; a robustness of the module with respect to changes in module parameters; a locality of decision bases of the module; a result ascertained by the module in a previous time operation; an indicator ascertained for the module in a previous time operation. All these indicators are suitable for measuring the reliability; in addition, they can be ascertained with acceptable computational effort at run time. Combinations of the indicators allow ascertaining the reliability in a reliable manner.

According to at least one disclosed embodiment, in addition to the overall result, a result reliability is output. This enables an evaluation of the overall result which is output within the scope of the further processing. For example, it may thus be detected whether the result reliability is sufficiently high to consider the overall result for further processing.

According to at least one disclosed embodiment, overall reliabilities of the two or more redundant modules are ascertained when ascertaining the reliabilities of the results. The overall reliability of a module unifies the various reliabilities ascertained in a different manner for a module into an overall result. For this purpose, from the ascertained values of the reliability, an instantaneous overall reliability is calculated and associated with the current calculation of the active module.

According to at least one disclosed embodiment, a prioritization of the two or more redundant modules is considered in the case of two or more results having the highest reliability. In this way, it may be ensured that, optionally, as modules deemed to be plausible, their results are passed on with the corresponding result reliability.

According to at least one disclosed embodiment, the prioritization of the two or more redundant modules is adjustable in a context-specific manner, for example, with respect to location, time, weather, traffic, or environment. It may thus be taken into consideration that, depending on the given context, the modules may have different levels of plausibility. For example, a module that is based on image processing may have a very high level of plausibility during daylight, but a very low level of plausibility in darkness.

According to at least one disclosed embodiment, activity parameters of the two or more redundant modules are measured. In the case of two or more results having the highest reliability, active modules are recommended when determining the overall result. These activity parameters express how active each module was in the previous period and also include reliability, precision, and the question of how often these modules were trusted. In this case, the immediate past has a major influence, while long-term experience has a minor influence. In this way, a certain constancy is achieved when determining the overall result; i.e., there is continuous switching between the results of the redundant modules.

According to at least one disclosed embodiment, intrinsic uncertainties of the two or more redundant modules are determined. In the case of two or more results having the highest reliability, modules having lower intrinsic uncertainty are recommended when determining the overall result. Even if the intrinsic uncertainty, i.e., the confidence, alone may be a poor indicator of the resolution of redundancy, in interaction with the reliability, it is completely suitable for resolving situations having several results having the highest reliability.

According to at least one disclosed embodiment, the overall result is determined by an interpolation of the results which is proportional to the ascertained reliabilities. If it is possible to interpolate the results, based on the present results, an overall result may be ascertained as an interpolation of the module results. In this way, all ascertained results contribute to a certain extent to the overall result. Optionally, the individual results receive a weighting which is proportional to the result reliability. It is thus ensured that results having a high result reliability contribute to the overall result having a greater weight.

Optionally, a disclosed method or a disclosed apparatus is used in a transportation vehicle, in particular, a transportation vehicle. In addition, redundancy concepts play a key role in many autonomous systems such as robotics, air and space travel, production, or safety monitoring such as reactor safety. The described solution for redundancy resolution is also suitable for such systems if data-driven approaches in redundant form are used there.

To improve the understanding of the principles of the present disclosure, embodiments of the present disclosure will be described below in greater detail, based on the figures. It is to be understood that the present disclosure is not limited to these embodiments, and that the described features may also be combined or modified without departing from the scope of protection of the present disclosure as it is defined in the appended claims.

Figure 1:
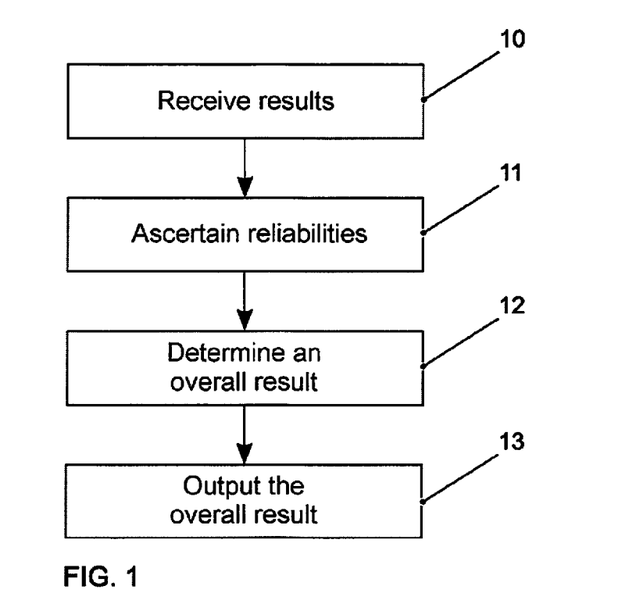
FIG. 1 schematically depicts a method for resolving a redundancy of two or more redundant modules.

FIG. 1 schematically depicts a method for resolving a redundancy of two or more redundant modules. In a first operation, results of the two or more redundant modules are received 10. In addition, reliabilities of the results are ascertained 11. Based on the ascertained reliabilities, an overall result is determined 12 from the results. The overall result thus determined is finally output 13 for further processing. In addition to the overall result, a result reliability may be output.

The reliability of the result of a module may, for example, be ascertained based on at least one of the following indicators: a robustness of the module with respect to changes to the input values; a robustness of the module with respect to changes in module parameters; a locality of decision bases of the module; a result ascertained by the module in a previous time operation; an indicator ascertained for the module in a previous time operation. In addition, when ascertaining the reliabilities of the results, overall reliabilities of the two or more redundant modules may be ascertained.

For example, the result having the highest reliability may be output as an overall result. In the case of two or more results having the highest reliability, a prioritization of the two or more redundant modules may be considered. The prioritization may, for example, be adjustable in a context-specific manner. Alternatively, activity parameters of the two or more redundant modules may be measured. In the case of two or more results having the highest reliability, active modules are then recommended when determining the overall result. Likewise, intrinsic uncertainties of the two or more redundant modules may be recorded. In the case of two or more results having the highest reliability, modules having lower intrinsic uncertainty are then recommended when determining the overall result. The overall result may in addition be determined by an interpolation of the results which is proportional to the ascertained reliabilities.

Figure 2:
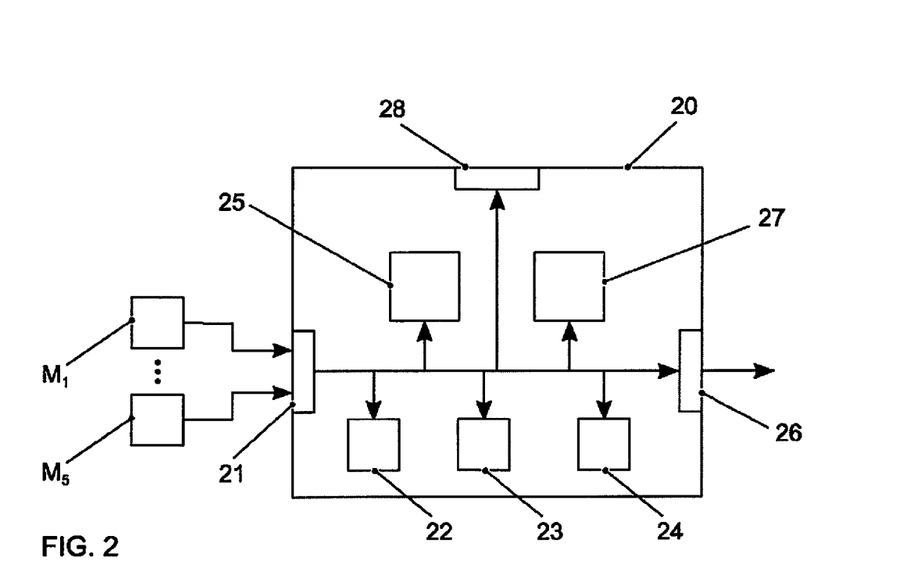
FIG. 2 depicts a first embodiment of an apparatus for resolving a redundancy of two or more redundant modules.

FIG. 2 shows a simplified schematic depiction of a first disclosed embodiment of an apparatus 20 for resolving a redundancy of two or more redundant modules. The apparatus 20 has an input 21 via which two or more redundant modules M1 . . . M5 are connected to the apparatus 20. A receiving unit 22 receives results of the two or more redundant modules M1 . . . M5. A processor unit 23 to the determines an overall result from the received results. In this case, the processor unit 23 considers reliabilities ascertained for the results. The results may be ascertained by the modules M1 . . . M5 themselves, by the processor unit 23, or by additional components. The additional components may be a component of the apparatus 20; however, they may also be arranged outside the apparatus 20. The reliability of the result of a module M1 . . . M5 may, for example, be ascertained on the basis of at least one of the following indicators: a robustness of the module M1 . . . M5 with respect to changes to the input values; a robustness of the module M1 . . . M5 with respect to changes in module parameters; a locality of decision bases of the module M1 . . . M5; a result ascertained by the module M1 . . . M5 in a previous time operation; an indicator ascertained for the module M1 . . . M5 in a previous time operation. In addition, when ascertaining the reliabilities of the results, overall reliabilities of the two or more redundant modules M1 . . . M5 may be ascertained. An output unit 24 outputs the overall result for further processing via an output 26 of the apparatus 20.

In addition to the overall result, a result reliability may be output via the output 26. The reception unit 22, the processor unit 23, and the output unit 24 may be controlled by a control unit 25. Via a user interface 28, settings of the receiving unit 22, the processor unit 23, the output unit 24, or the control unit 25 may possibly be changed. The data arising in the apparatus 20, for example, the data generated by the processor unit 23 or the output unit 24, may be stored in a memory 27 of the apparatus 20, for example, for a later evaluation or for a use by the components of the apparatus 20. The receiving unit 22, the processor unit 23, the output unit 24, and the control unit 25 may be implemented as dedicated hardware, for example, as integrated circuits. Of course, they may, however, also be partially or completely combined or implemented as software which runs on a suitable processor, for example, on a GPU. The input 21 and the output 26 may be implemented as separate interfaces or as a combined bidirectional interface.

For example, the result having the highest reliability may be determined as the overall result by the processor unit 23. In the case of two or more results having the highest reliability, the processor unit 23 may consider a prioritization of the two or more redundant modules M1 . . . M5. The prioritization may, for example, be adjustable in a context-specific manner. Alternatively, activity parameters of the two or more redundant modules M1 . . . M5 may be measured. In the case of two or more results having the highest reliability, active modules M1 . . . M5 are then recommended by the processor unit 23 when determining the overall result. Likewise, intrinsic differences between the two or more redundant modules M1 . . . M5 may be recorded. In the case of two or more results having the highest reliability, modules M1 . . . M5 having lower intrinsic uncertainty are then recommended by the processor unit 23 when determining the overall result. In addition, the processor unit 23 may determine the overall result via an interpolation of the results which is proportional to the ascertained reliabilities.

Figure 3:
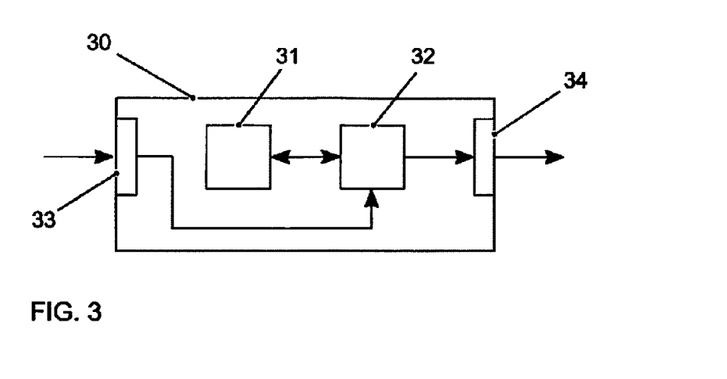
FIG. 3 depicts a second embodiment of an apparatus for resolving a redundancy of two or more redundant modules.

FIG. 3 depicts a simplified schematic representation of a second disclosed embodiment of an apparatus 30 for resolving a redundancy of two or more redundant modules. The apparatus 30 comprises a processor 32 and a memory 31. For example, the apparatus 30 is a computer or a control unit. Instructions are stored in the memory 31 which cause the apparatus 30 to execute the operations according to one of the described methods during execution by the processor 32. The instructions stored in the memory 31 thus incorporate a program which is executable by the processor 32, and which implements the disclosed method. The apparatus 30 has an input 33 for receiving information, for example, data which were recorded by a sensor system of the transportation vehicle. Data generated by the processor 32 are provided via an output 34. In addition, the data may be stored in the memory 31. The input 33 and the output 34 may be combined into a bidirectional interface.

The processor 32 may comprise one or multiple processor units, for example, microprocessors, digital signal processors, or combinations thereof.

The memories 27, 31 of the described embodiments may have both volatile and non-volatile memory ranges and may comprise a variety of storage devices and storage media, for example, hard disk drives, optical storage media, or semiconductor memory.

Figure 4:
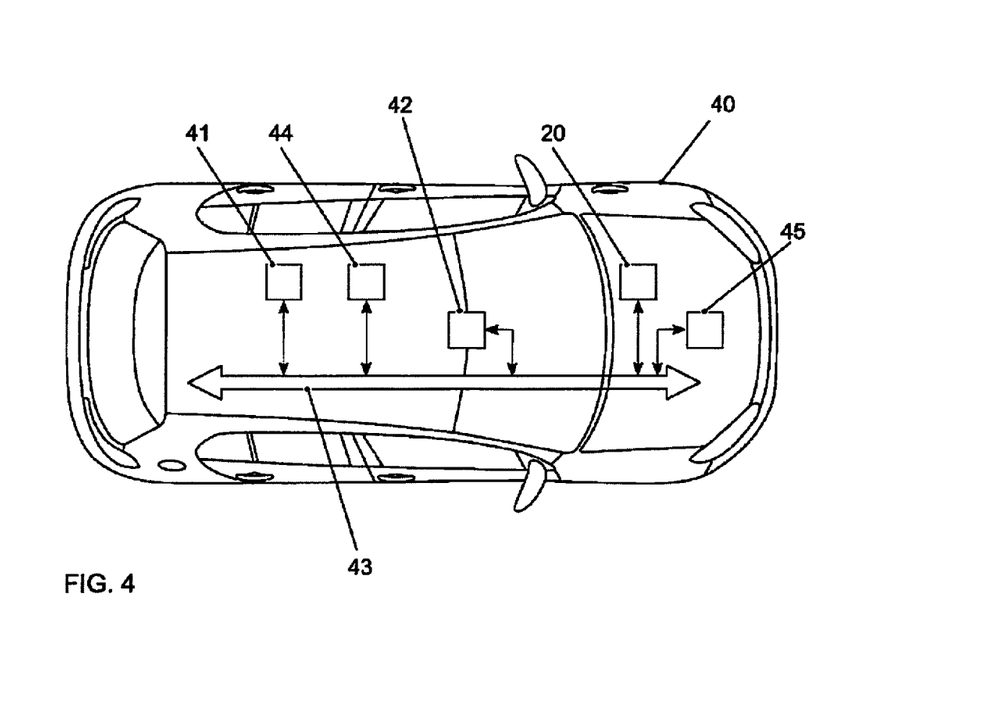
FIG. 4 schematically depicts a transportation vehicle in which a solution has been implemented.

FIG. 4 schematically depicts a transportation vehicle 40 in which a disclosed solution is implemented. The transportation vehicle 40 comprises, inter alia, a navigation system 41 and an environment sensor system 42, for example, a camera system and a radar system. The data recorded by the environment sensor system 42 are transmitted via a network 43 to an apparatus 20 for resolving a redundancy of two or more modules. The data generated by the apparatus 20 may be stored in a memory 44 of the transportation vehicle 40. In addition, the data may be provided to a driver assistance system 45 of the transportation vehicle 40, for example, for lane planning. Furthermore, the data may be communicated to the driver by a user interface, for example, an infotainment system having a display device.

Figure 5:
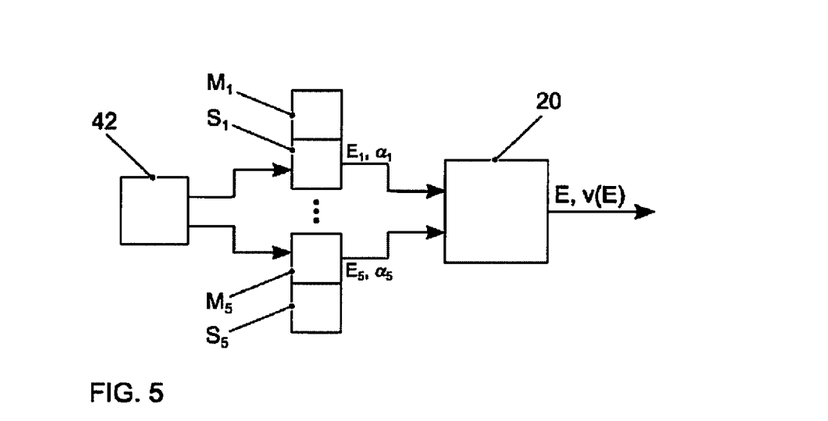
FIG. 5 schematically depicts a system of various modules in which an overall result is ascertained based on input values.

A disclosed embodiment will be described below based on FIGS. 5 and 6.

The interaction of various novel software components which are based on existing technological approaches will be considered. On the one hand, these software components calculate an uncertainty of a specific software module along the processing chain of the automated driving, i.e., from the sensor system to the actuator system. On the other hand, in the case of redundantly occurring modules, they calculate a result reliability, to use it for the resolution of the redundancy. In terms of the conceptual approach, it is expedient to ascertain result reliabilities for each result. In the case that a result is provided by only one module, the reliability ascertained by the module may therefore be adopted as the result reliability, and possibly multiplied by a basic confidence value of the module. An example of a system of software components and software modules is schematically depicted in FIG. 5.

In the example, five software modules M1 ... M5 are present which receive sensor data or analysis results from an environment sensor system 42. For each software module M1 ... M5, an associated software component S1 ... S5 ascertains a reliability of the respective software module M1 ... M5. In this case, the software modules M1 ... M5 and the respective associated software components S1 ... S5 can form a unit, as indicated in FIG. 5. From the respective module reliability and from the corresponding values of previous work operations, overall values $\alpha 1$ ... $\alpha 5$ are ascertained for the current reliability of the module results E1 ... E5. The results E1 ... E5 of the software modules M1 ... M5 and the ascertained reliabilities $\alpha 1$ ... $\alpha 5$ are passed to a component 20 for resolving a redundancy.

In terms of content, the reliability to be calculated $\alpha 1$ ... $\alpha 5$ expresses how reliable, i.e., how little uncertain, the current output value is for the given current input values and the given recent past. For this purpose, at run time, various measurements or analyses are carried out. The measurements are carried out by software components S1 ... S5 for each redundantly occurring processing module M1 ... M5 which are installed in parallel with the active module M1 ... M5, and function independently of one another. They provide numbers or vector-valued results $\alpha 1$ ... $\alpha 5$, which evaluate the reliability of the current module output E1 ... E5 from various viewing directions. Due to the high level of computing effort, it may be expedient not to calculate the reliability in each time operation. In this operation, the last-calculated reliability is obtained. Various approaches are available for the measurements.

For example, by slightly varying or perturbing the input values, the stability of the module decision with respect to slight variance of the input values may be measured. For this measurement, the input values may be superimposed, for example, with noise.

By slightly varying the module M1 ... M5, the stability of the module decision with respect to slight model variances may be measured. Examples of the variation of the module M1 ... M5 include Monte Carlo dropouts [1] at run time, or slightly changing the model weightings in the case of neuronal networks or support vector machines. In the case of dropout, a specified quantity of neurons in each level of a neuronal network are deactivated and are not considered for the upcoming calculation operation.

With the aid of plausibility check methods, the decisive ranges of the input values, which have most strongly shaped the current module decision E1 ... E5, may be ascertained. Examples of such plausibility check methods include heat-mapping (a heatmap is a visualization of an input value, for example, of an input map, which indicates which features of the input value a machine learning model considers to be important for achieving a classification) [2], Lime [3] (local interpretable model-agnostic explanations), or deep Taylor decompositions [4]. The concentration of this range, i.e., the extension across the input values or locality in the current input values, can permit information about the reliability of the current result E1 ... E5 for certain modules M1 ... M5. For example, sign recognitions or priority determinations have highly local decision bases in the picture. Prediction algorithms should concentrate their prediction on specific objects in the environment model and few context variables.

Many modules M1 ... M5 provide "intrinsic" confidences, i.e., a kind of uncertainty evaluation of the current output. These confidences may be handled like sensor confidences, as practically every sensor transmits them, and also provide indications of a reliability of the current result. High confidences should correlate with a high reliability. However, they may also be due to a training bias; thus, the confidences are to be considered with caution. In the case of neuronal networks, the intrinsic confidence is often a softmax interpretation of the result as a probability.

Alternatively, the estimations of the reliability may also be generated offline, i.e., not at run time in the transportation vehicle. In addition, by one or several of the above-described measurements, all possible input values may be evaluated and stored as a vector via the input values. At run time, they may then read out and passed on corresponding to the given input values. This approach is extraordinarily performant and is above all suitable in the case of comparatively small quantities of possible input values.

Adjusted to the respective application case, overall values $\alpha 1 \ldots \alpha 5$ for the current reliability of the module results E1 ... E5 are now ascertained from the ascertained values of the module reliabilities and from the corresponding values of previous work operations. Together with the respective module results E1 ... E5, they are passed to the apparatus 20 for ascertaining the result reliability.

For this purpose, the ascertained module results E1 ... E5 are compared and their difference is determined. In this case, matching module results E1 ... E5 are combined. It is possible to define when module results E1 ... E5 are to be evaluated as matching, adjusted to the respective application case. Optionally, sufficiently similar results E1 ... E5 may also be evaluated as matching. This primarily affects modules M1 ... M5 which have a "dense output," i.e., "dense" or continuous output values, for example, images. In this case, a distance between the outputs can be defined, and results E1 ... E5 which are sufficiently close to one another can be evaluated as matching. The results E1 ... E5 are sufficiently close if their distance is smaller than a defined threshold value, wherein the threshold value may be a function of the application case. For various segmentation or classification algorithms, the distance between the outputs may, for example, be defined by the Jaccard coefficients. To calculate the Jaccard coefficients of two quantities, the number of shared elements, i.e., the intersection, is divided by the value of the union. The Jaccard coefficient is a measure of the similarity of the results E1 ... E5.

For the resulting results E1 ... E5, a specific instance is selected as the representative, typically, the result E1 ... E5 having the highest reliability $\alpha 1 \ldots \alpha 5$, and a result reliability $v(E1) \ldots v(E5)$ is determined. The reliability is above the maximum of the individual reliability values $\alpha 1 \ldots \alpha 5$. In the case of redundantly occurring modules M1 ... M5 which output the same or a sufficiently similar result E1 ... E5, the result reliability of this result E1 ... E5 is an aggregated measure of the common plausibility of the result E1 ... E5 considering all modules M1 ... M5 having this result. It is a common output value of these modules M1 ... M5 for the current result E1 ... E5 and is of the same data type as the individual reliabilities $\alpha 1 \ldots \alpha 5$. In addition to the individual reliabilities $\alpha 1 \ldots \alpha 5$, the specific formula for calculating the result reliability may also include fixedly defined plausibilities of the modules M1 and M5. It is optionally provided as a fixed arithmetic formula.

The ascertained result reliabilities are then used for resolving the redundancy. In this case, typically, the result E1 ... E5 having the highest result reliability is classified as correct, and is transferred to the subsequent processing modules. In addition, the achievement of a minimum result reliability can be made into a condition, as necessary. The ascertained result reliability can be used as the input value for the subsequent modules. In the case that the reliability $\alpha 1 \ldots \alpha 5$ is not calculated in each time operation, the redundancy is resolved with lower frequency than the measurements are carried out. The resolution of the redundancy is then retained until the next calculation of the reliability $\alpha 1 \ldots \alpha 5$.

Should various contradictory results E1 ... E5 have the same greatest result reliability, it is possible to choose among the corresponding results E1 ... E5 according to a fixed priority of the modules M1 ... M5. In this case, the module M1 ... M5 which is classified as the most plausible transmits its result E1 ... E5 having the corresponding result reliability. However, alternative approaches of redundancy resolution may also be implemented.

For example, within the scope of a constancy approach, activity parameters are measured for each module M1 ... M5. These activity parameters express how active each module M1 ... M5 was in the previous period, and include reliability, precision, and the question of how frequently these modules M1 ... M5 were trusted. In this case, the immediate past has a major influence; long-term experience has a minor influence. Active modules M1 ... M5 are recommended in the case of equal maximum result reliability.

In a context-specific approach, the above-described prioritization of redundantly occurring modules M1 ... M5 is modified in a context-specific manner, for example, as a function of location, time, weather, traffic, or environment.

Within the scope of an extrinsic-intrinsic approach, in the case of equal maximum extrinsic reliability, the module M1 ... M5 is trusted which singles out a lower intrinsic uncertainty, i.e., a higher confidence. Should this also be equal, the values of the immediate past are used.

An alternative form of the redundancy resolution is based on an allocation approach. If the results E1 ... E5 are interpolable, then, based on the available results E1 ... E5, an overall result is ascertained as the interpolation of the module results E1 ... E5. In this case, the individual results E1 ... E5 receive a weighting which is proportional to the result reliability. In this way, results E1 ... E5 having high result reliability contribute a higher weighting to the overall result.

Figure 6:
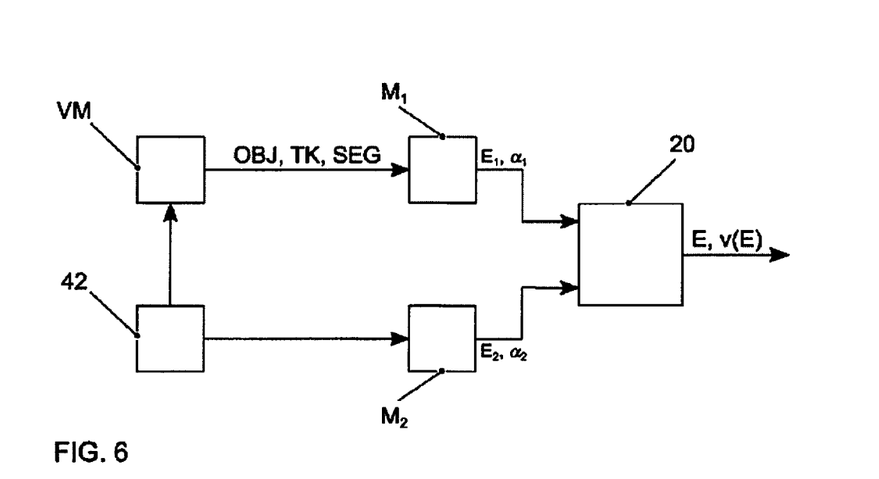
FIG. 6 illustrates the determination of an overall result from the individual results of two modules.

An example of the determination of an overall result from the individual results E1, E2 of two modules M1, M2 is depicted in FIG. 6. Within the scope of establishing an understanding of the environment, a so-called open-field detection must be carried out by the transportation vehicle, i.e., an evaluation of the space in which it is possible to drive without risk. This detection may then be carried out by various modules M1, M2 based on the data of the environment sensor system 42.

In the example, module M1 processes preprocessed information of other modules, which are combined in FIG. 6 into a preprocessing module VM. For example, object data OBJ may be provided by an object detection, a depth map TK may be provided by a depth estimation, and segmentation data SEG may be provided by a semantic segmentation. The aforementioned modules are regarded here as virtual sensors, the output values of which are used by M1 as input values.

On the other hand, module M2 is based on a sensor fusion of camera, radar, and lidar. Of course, other modules are conceivable, which all simultaneously perform a measurement of the free space.

The modules M1 and M2 constitute a redundant measurement system for ascertaining the free space. They will generally not ascertain an unambiguous result E1, E2, in particular, in the case of data-driven modules which originated by machine learning. It is then to be ascertained which module M1, M2 is to be trusted most strongly, thus, which result E1, E2, has the highest reliability $\alpha 1, \alpha 2$.

For this purpose, for each module M1, M2 in addition to its actual measurement result E1, E2, i.e., the ascertained free space, a reliability $\alpha 1, \alpha 2$ is also ascertained. The reliability $\alpha 1, \alpha 2$ provides information about how trustworthy this current measurement result E1, E2, is for this module M1, M2. In addition to the measurement result E1, E2, this value is a second output value of each module M1, M2.

In the case of differing measurement results E1, E2, the measurement result E1, E2 having the higher reliability α1, α2 will typically be used. However, if both modules M1, M2 provide the same or a sufficiently similar result, this result must be classified as more reliable. The modules M1 and M2 provide the same result E having the reliabilities α1 and α2. An approach for the result reliability of E is then simply the sum α1+α2.

For many applications, it is expedient if the reliabilities are always values between 0 and 1, or vectors of such values. In this case, the result reliability of the result E may be calculated as:

$$v(E) = 1 - (1-\alpha_1)(1-\alpha_2) \cdot \ldots \cdot (1-\alpha_n) = 1 - \prod_{i=1}^{n}(1-\alpha_i), \quad (1)$$

if the modules $M_1 \ldots M_n$ have ascertained the same result E having reliability $\alpha_1 \ldots \alpha_n$.

Alternatively, the plausibility c(Mi) of the modules is calculated by the formula:

$$v(E) = 1 - (1-c(M_1)\alpha_1)(1-c(M_2)\alpha_2) \cdot \ldots \cdot (1-c(M_n)\alpha_n) \quad (2)$$
$$= 1 - \prod_{i=1}^{n}(1-c(M_i)\alpha_i),$$

In the case of vectorial reliability values, the formulas are to be understood as component-wise formulas, for example:

$$v(E)_j = 1 - \prod_{i=1}^{n}(1-c(M_i)\cdot(\alpha_i)_j), \quad (3)$$

wherein $v(E)_j$ denotes the j-th entry of the vector of the result reliability of the result E, and $(\alpha_i)_j$ is the j-th entry the current reliability of the module $M_i$.

LIST OF REFERENCE CHARACTERS

10 Receive results
11 Ascertain reliabilities
12 Determine an overall result
13 Output the overall result
20 Apparatus
21 Input
22 Receiving unit
23 Processor unit
24 Output unit
25 Control unit
26 Output
27 Memory
28 User interface
30 Apparatus
31 Memory
32 Processor
33 Input
34 Output
40 Transportation vehicle
41 Navigation system
42 Environment sensor system
43 Network
44 Memory
45 Driver assistance system
$\alpha_1 \ldots \alpha_5$ Reliability
$E_1 \ldots E_5$ Result
$M_1 \ldots M_5$ Module
$S_1 \ldots S_5$ Software component
OBJ Object data
SEG Segmentation data
TK Depth map
VM Preprocessing module

REFERENCES

[1] Gal et al.: "Dropout as a Bayesian approximation: representing model uncertainty in deep learning," Proceedings of the 33rd International Conference on Machine Learning (ICML'16), Vol. 48 (2016), pp. 1050-1059.
[2] www.heatmapping.org
[3] Ribeiro et al.: "'Why Should I Trust You?': Explaining the Predictions of Any Classifier", Proceedings of the 22nd ACM SIGKDD International Conference on Knowledge Discovery and Data Mining (KDD'16) (2016), pp. 1135-1144.
[4] Montavon et al.: "Explaining nonlinear classification decisions with deep Taylor decomposition", Pattern Recognition, Vol. 65 (2017), pp. 211-222.

The invention claimed is:

1. A method for resolving a redundancy of two or more redundant modules that process environmental sensor data generated by sensors of a transportation vehicle, the method being executed by a computer during execution of instructions stored on a non-transitory computer-readable storage medium, the method comprising:

by a processor, receiving, from a first redundant module of the two or more redundant modules, a first input signal including a first result and receiving, from a second redundant module of the two or more redundant modules, a second input signal including a second result, wherein the first result is based on analysis of data by the first redundant module, wherein the second result is based on analysis of the data by the second redundant module, and wherein the data includes data received from a sensor system of the transportation vehicle;

ascertaining, by the processor, a first reliability of the first result and a second reliability of the second result, wherein ascertaining the first reliability of the first result includes ascertaining a first stability of the first redundant module and ascertaining the second reliability of the second result includes ascertaining a second stability of the second redundant module, and wherein ascertaining the first and second stabilities includes weighing output values of the first and second redundant module generated in response to varying input values to the first and second redundant module;

determining, by the processor, an overall result based on a comparison between the first and second reliabilities of the first and second results, wherein the overall result corresponds to the first result in response to the first reliability being greater than the second reliability, and the overall result corresponds to the second result in response to the second reliability being greater than the first reliability; and controlling, by the processor, transportation vehicle functionality based on the determined overall result to resolve the redundancy between the two or more redundant modules that process environmental sensor data generated by the transportation vehicle sensors.

2. The method of claim 1, wherein ascertainment of reliabilities of the results is based on at least one of the following indicators: a robustness of each of the first redundant module and the second redundant module with respect to changes in module parameters; a locality of decision bases of each of the first redundant module and the second redundant module; a result ascertained by each of the first redundant module and the second redundant module in a previous time operation; and an indicator ascertained for each of the first redundant module and the second redundant modules in a previous time operation.

3. The method of claim 1, wherein controlling the transportation vehicle is based on the reliability of the result corresponding to the overall result.

4. The method of claim 1, wherein ascertaining the reliabilities of the results includes ascertaining overall reliabilities of the two or more redundant modules.

5. The method of claim 1, further comprising, in response to the first reliability being equal to the second reliability, determining the overall result based on a prioritization of the first redundant module and the second redundant module.

6. The method of claim 5, wherein the prioritization of the two or more redundant modules is adjustable in a context-specific state.

7. The method of claim 1, further comprising measuring activity parameters of the two or more redundant modules, and, in response to two or more results having the highest reliability, selecting active modules to determine the overall result.

8. The method of claim 1, wherein intrinsic uncertainties of the two or more redundant modules are detected, and, in response to two or more results having the highest reliability, modules having lower intrinsic uncertainty are chosen when determining the overall result.

9. The method of claim 1, wherein determining the overall result includes an interpolation of the results proportional to the ascertained reliabilities of the results.

10. A non-transitory computer-readable storage medium having instructions which, when executed by a computer, trigger the computer for executing a method for resolving a redundancy of decisions of two or more redundant modules that process environmental sensor data generated by sensors, the method comprising:
receiving, by a processor of a transportation vehicle, input signals including results of the two or more redundant modules of the transportation vehicle, wherein each of the results is based on analysis of data by a corresponding one of the two or more redundant modules, and wherein the data includes data received from a sensor system of the transportation vehicle;
ascertaining, by the processor, reliabilities of each of the results, wherein ascertaining reliabilities of each of the results includes ascertaining stabilities of each of the two or more redundant modules based on weighing output values of each of the two or more redundant modules generated in response to varying input values to each of the two or more redundant modules;
determining, by the processor, an overall result from the results based on a comparison between the reliabilities of the results, wherein the overall result corresponds to a first result associated with a first reliability in response to the first reliability being greater than any other of the reliabilities; and
controlling, by the processor, transportation vehicle functionality based on the determined overall result to resolve the redundancy between the two or more redundant modules that process environmental sensor data generated by the transportation vehicle sensors.

11. An apparatus for resolving a redundancy of two or more redundant modules that process environmental sensor data generated by sensors of a transportation vehicle, the apparatus comprising:
a sensor system configured to transmit a signal including data indicative of an operating environment of the transportation vehicle;
a first redundant module and a second redundant module, wherein the first redundant module and the second redundant modules are communicatively coupled to the sensor system and configured to receive the signal from the sensor system, wherein the first redundant module is configured to analyze the data of the signal and output a first result, and wherein the second redundant module is configured to analyze the data of the signal and output a second result; and
a processor communicatively coupled to the first redundant module and the second redundant module, wherein the processor is configured to:
receive the first result of the first redundant module and the second result of the second redundant module,
ascertain a first reliability of the first result and a second reliability of the second result, wherein ascertaining the first reliability of the first result includes ascertaining a first stability of the first redundant module and ascertaining the second reliability of the second result includes ascertaining a second stability of the second redundant module, and wherein ascertaining the first stability and the second stability includes weighing output values of the first redundant module and the second redundant module generated in response to varying input values to the first redundant module and second redundant module,
determine an overall result based on a comparison between the first reliability of the first result and the second reliability of the second result, wherein the overall result corresponds to the first result in response to the first reliability being greater than the second reliability, and the overall result corresponds to the second result in response to the second reliability being greater than the first reliability; and
control the transportation vehicle functionality based on the determined overall result to resolve the redundancy between the two or more redundant modules that process environmental sensor data generated by the transportation vehicle sensors.

12. The apparatus of claim 11, wherein the processor is configured to ascertain the first reliability and the second reliability based on at least one of a robustness of each of the redundant modules with respect to changes in module parameters, a locality of decision bases of each of the redundant modules, a result ascertained by each of the redundant modules in a previous time operation, and an indicator ascertained for each of the redundant modules in a previous time operation.

13. The apparatus of claim 11, wherein the processor is configured to control the transportation vehicle based on the reliability of the result corresponding to the overall result.

14. The apparatus of claim 11, wherein to ascertain the first reliability of the first result and the second reliability of the second result, the processor is configured to ascertain overall reliabilities of the two or more redundant modules.

15. The apparatus of claim 11, wherein the processor is configured to, in response to the first reliability and the second reliability being equal, select one of the first result and the second result based on a prioritization of the first redundant module and the second redundant module.

16. The apparatus of claim 15, wherein the prioritization of the two or more redundant modules is adjustable in a context-specific state.

17. The apparatus of claim 11, wherein the processor is configured to measure activity parameters of each of the first redundant module and the second redundant module, and, in response to the first reliability being equal to the second reliability, determine the overall result based on the first result in response to a first activity of the first redundant module being greater than a second activity of the second redundant module, and determine the overall result based on the second result in response to the second activity being greater than the first activity.

18. The apparatus of claim 11, wherein intrinsic uncertainties of the two or more redundant modules are detected, and, in response to two or more results having the highest reliability, modules having lower intrinsic uncertainty are chosen when determining the overall result.

19. The apparatus of claim 11, wherein the processor is configured to determine the overall result based on an interpolation of the results to the ascertained reliabilities of the results.

* * * * *